United States Patent [19]
Onufry, Jr.

[11] Patent Number: 5,712,915
[45] Date of Patent: Jan. 27, 1998

[54] ENCRYPTED DIGITAL CIRCUIT MULTIPLICATION SYSTEM

[75] Inventor: Michael Onufry, Jr., Bethesda, Md.

[73] Assignee: Comsat Corporation, Bethesda, Md.

[21] Appl. No.: 478,650

[22] Filed: Jun. 7, 1995

[51] Int. Cl.$^6$ .................................... H04L 9/00
[52] U.S. Cl. ............................................... 380/49
[58] Field of Search ................... 380/49; 379/100; 381/46

[56] References Cited

U.S. PATENT DOCUMENTS

| | | | |
|---|---|---|---|
| 3,959,592 | 5/1976 | Ehrat | 179/1.5 E |
| 5,054,068 | 10/1991 | Hess et al. | 380/49 |
| 5,159,638 | 10/1992 | Naito | 381/46 |
| 5,161,191 | 11/1992 | Gupta et al. | 380/37 |
| 5,226,044 | 7/1993 | Gupta et al. | 370/81 |
| 5,245,655 | 9/1993 | Buhn et al. | 380/18 |
| 5,257,262 | 10/1993 | Shioka et al. | 370/112 |
| 5,280,532 | 1/1994 | Shenoi et al. | 370/118 |
| 5,303,303 | 4/1994 | White | 380/49 |
| 5,307,174 | 4/1994 | Saito | 358/400 |
| 5,493,610 | 2/1996 | Suzuki | 379/100 |
| 5,559,890 | 9/1996 | Obermeier | 380/49 |

Primary Examiner—Thomas H. Tarcza
Assistant Examiner—Carmen D. White
Attorney, Agent, or Firm—Sughrue, Mion, Zinn, Macpeak & Seas, PLLC

[57] ABSTRACT

A digital circuit multiplier (DCM) system which permits encrypted signals to obtain a multiplication gain at the DCM equipment without decrypting the signals at the DCM equipment. Detection of speech/silence is made at the encryption stage and distinct and separable encryptions are applied to the speech and silence portions of the signal, as well as a control signal indicating which portions of the encrypted data stream correspond to speech and silence. At the DCME transmit unit, only the control signal portion of the data stream is decrypted and the encrypted silence frames are discarded to obtain multiplication gain. Thus, efficient use is made of the channel capacity without the need to decrypt the speech signal at the DCME. At the DCME receive unit the control signals are used to add encrypted silence frames back into the data stream. Once the received signals have reached a secure location, the decrypter unit decrypts the speech and silence frames to present a reconstituted speech signal, complete with silent portions, to the end user.

16 Claims, 9 Drawing Sheets

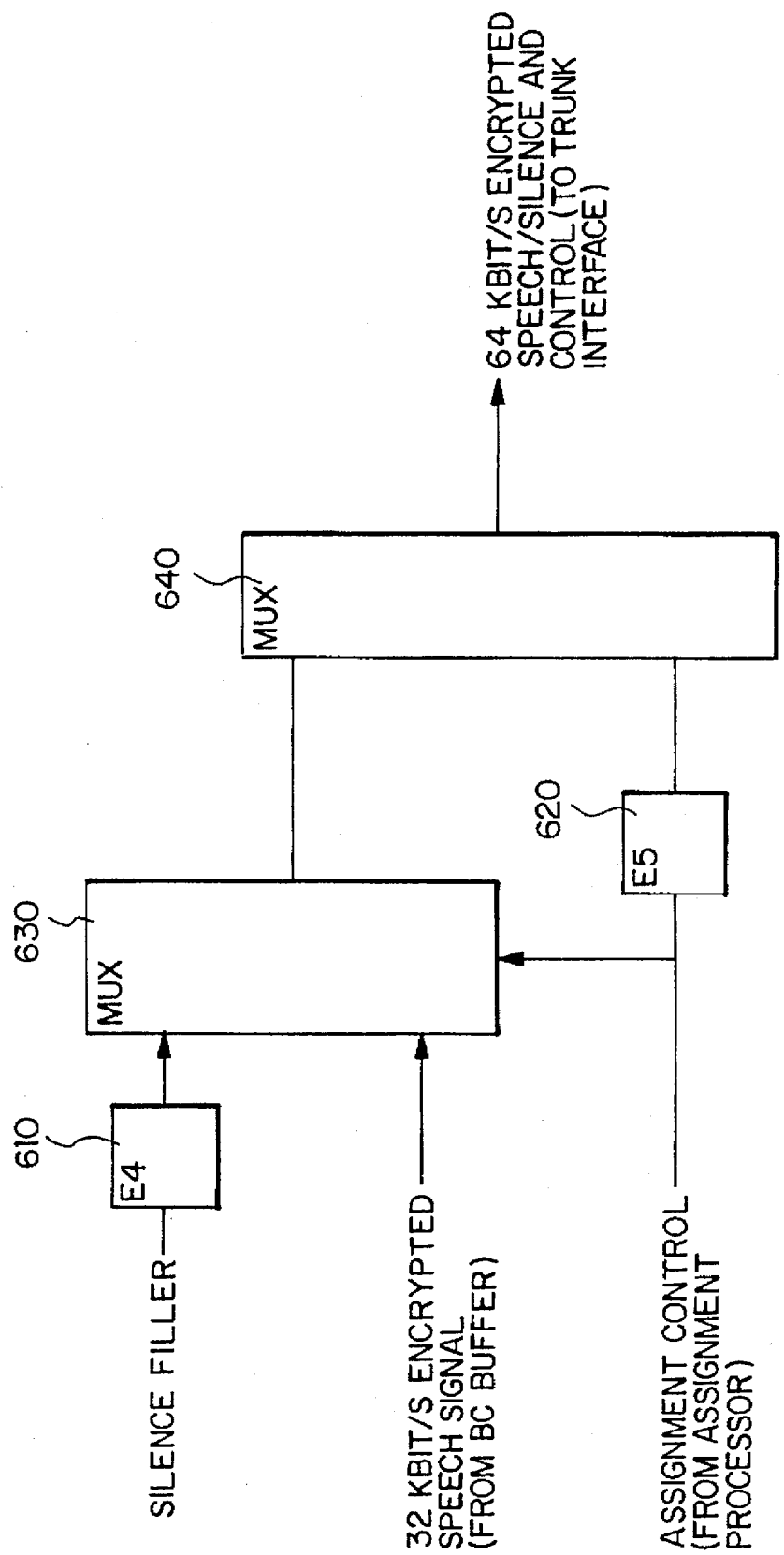

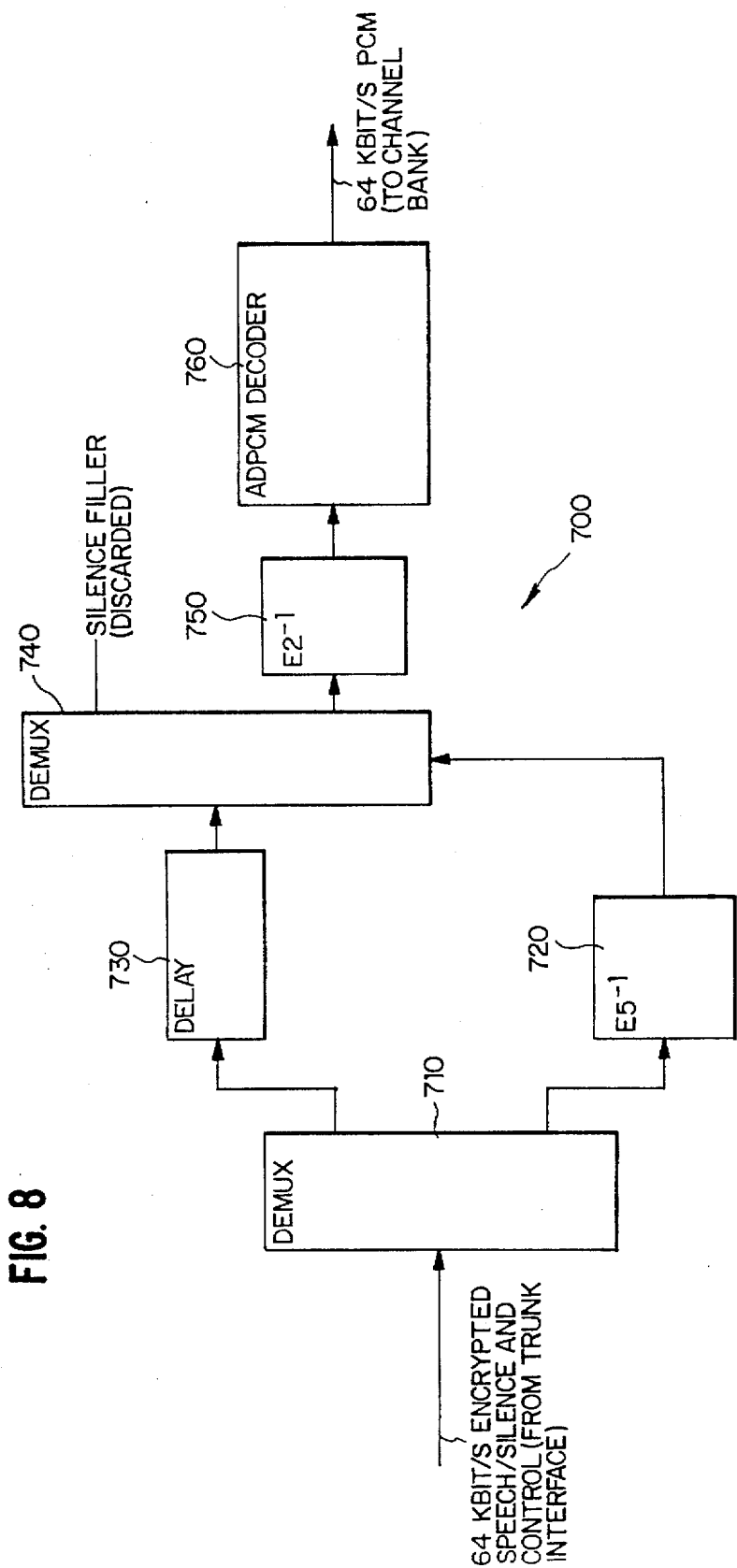

ENCRYPTED DIGITAL CIRCUIT MULTIPLICATION SYSTEM

BACKGROUND OF THE INVENTION

1. Field of the Invention

The invention relates to the field of multiplexed communication of digital signals and, in particular, to a speech and data communication system which is usable on undersea, terrestrial and satellite communication links. More specifically, it relates to a system for digital circuit multiplication (DCM) to achieve a speech interpolation gain when the signal being transmitted has been encrypted at the source.

2. Description of the Background Art

An illustrative example of a typical implementation of digital circuit multiplication equipment (DCME) in a telephone connection can be seen in the block diagram of FIG. 1. The basic purpose of digital circuit multiplication equipment (DCME) 12 is to provide a channel interface between a bank of terrestrial channels 10 and a bank of transmission channels 11. The terrestrial channels 16 are typically telephone channels conveying voice or data traffic. The terrestrial channels 16 could also be carrying ISDN (integrated services digital network) traffic. The transmission channels (or bearer channels) 11 may be channels carried across any transmission medium, such as an undersea cable, a terrestrial cable, a surface-to-surface microwave link, or a satellite radio link. Echo control 13 is required to prevent echo from loading the DCME. The echo control 13 may also be digitally provided, and in the public switched network can be located anywhere along the terrestrial channels 16.

A digital circuit multiplication system (DCMS) is defined as being a telecommunications network comprised of two or more digital circuit multiplication equipment (DCME) terminals, where each terminal contains a transmit unit and a receive unit. Digital circuit multiplication equipment (DCME) is defined as a general class of equipment which permits the concentration of a number of 64 kbit/s PCM encoded input trunk channels on a reduced number of transmission channels.

A conventional DCM system achieves multiplication gain in two ways. First, it obtains a transcoding gain by re-encoding terrestrial channel data streams at slower bit rates. Second, it obtains an interpolation gain for those signals (such as speech) which contain periods of silence. Thus, the amount of multiplication gain which is obtained by the DCM system is the combined result (i.e., product) of the transcoding gain and the interpolation gain.

Transcoding gain is realized when a digital signal is recoded using an algorithm which permits fewer bits per sample to be used. The most salient advantage of this is that a lower bit rate bearer channel may be used. For example, if a 64 kbit/s, eight-bit per sample signal is re-encoded as a 32 kbit/s, four-bit per sample signal, a transcoding gain of 2.0 has been realized. Likewise, if a 64 kbit/s, eight-bit per sample signal is re-encoded as a 24 kbit/s, three-bit per sample signal (which is used in the DCME overload mode), a transcoding gain of 2.67 has been realized. Such low rate encoding (LRE) may cause a degree of degradation of the ultimate decoded signal quality, resulting in a trade-off of channel utilization efficiency versus signal quality.

Regarding channels carrying speech information, a transmitting DCME conventionally functions to detect silence portions of a number of incoming speech signals. It then allocates transmission channels to those terrestrial channels which are active (i.e., not silent), thus achieving a time multiplexing of the speech signals and creating a time interpolation gain. The transmitting DCME also transmits along with the multiplied signal sufficient control information for a receiving DCME to demultiplex each of the speech signals, match up each transmission channel with the appropriate terrestrial channel, and thereby reconstitute each speech information bit stream complete with its appropriate silence portions.

The degree of interpolation gain which can be realized by DCME is dependent upon how much silence is detected and removed. As the portion of a given speech signal which is silence increases, the amount that can be removed increases. Accordingly, increased proportions of silence in the signal means increased multiplication may be realized, resulting in more efficient use of the channel capacity. Often, about two-thirds of a given speech signal is silence, either while the speaker is listening to the other party or during intersyllabic pauses. Due to control signal overhead, the gain produced by time interpolation is generally in the range of 2 to about 2.5.

According to the digital circuit multiplication (DCM) process as heretofore practiced, once speech has been encrypted at the source and subsequently presented to a circuit multiplication system, the only way it could be passed through to a transmission channel is to treat the signal as a data channel which has a 100 percent activity factor and, therefore, no interpolation gain is possible. There are two reasons for this.

First, the speech detector in the DCM device is no longer capable of recognizing the presence or absence of a speech spurt once the signal has been encrypted. This is a simple result of the fact that once a speech signal has been encrypted there is no way to tell where the speech/silence transitions are.

Second, even if it were possible (without decryption) to detect the speech/silence transitions in an encrypted speech signal, no part of the encrypted signal can be removed to obtain an interpolation gain and still permit the called party to recover the encrypted signal. Failing to transmit the encrypted silence portions of the signal through to the recipient would result in an unusable signal. The decrypter at the recipient station could not decrypt the signal without the encrypted silence portions.

This presents a dilemma: If one wishes to pass encrypted speech through DCME, one must sacrifice either efficient use of channel capacity or the security of the data. The dilemma is due to the need to choose whether or not to decrypt the data at the DCM equipment.

If the data is not decrypted at the DCME, it remains secure from detection by undesired parties, however, no multiplication gain can be realized because the DCM has no choice but to treat the encrypted signal as a signal having a 100 percent activity factor, since it cannot detect what portions of the signal represent silence in the signal. If the data is decrypted at the DCME, the DCME may operate to obtain a more efficient use of the channel by obtaining an interpolation gain and, perhaps too, a transcoding gain. However, even if the data stream is immediately re-encrypted, the data is vulnerable to eavesdropping by undesired parties at the DCM. Even then, the DCME operation would be limited to the particular encryption algorithm used at the source, and for universal operation in an open network all encryption algorithms would have to be resident in the DCME.

The type of DCM equipment currently standardized by the ITU-T (formerly, the CCITT) as the G.763 standard (Rev. 2, published February. 1995) for DCME using ADPCM and digital speech interpolation is considered as a baseline system which is well known to persons of ordinary skill in the art. The ITU-T G.766 standard (published April 1993) for facsimile demodulation/remodulation for digital circuit multiplication equipment is also well known to persons skilled in the art.

The following ITU-T V-Series Recommendations are incorporated by reference:

V.8 (09/94) [New] [10 pp.] [Publ.: November 1994] [PN: V.id] Procedures for starting sessions of data transmission over the general switched telephone network;

V.17 (02/91) [New] [11 pp.] [Publ.: May 1991] A 2-wire modem for facsimile applications with rates up to 14,400 bit/s;

V.34 (09/94) [New] [63 pp.] [Publ.: December 1994] [PN: V.fast] A modem operating at data signalling rates of up to 28,800 bit/s for use on the general switched telephone network and on leased point-to-point 2-wire telephone-type circuits.

Also, a general disclosure of the state-of-the-art in DCME is made in U.S. Pat. No. 5,226,044 to Gupta et al., which is incorporated by reference into this application. Gupta et al. '044 is directed to a solution of the problems of mistracking of the decoder on the receiving end due to clipping caused at the transmitting end as a result of digital speech interpolation.

U.S. Pat. No. 5,280,532 to Shenoi et al. shows a trunking system for receiving encoded digital speech data and producing speech interpolation on the data.

U.S. Pat. No. 5,161,191 to Gupta et al. shows a system which combines a time division multiplexer (TDM) with an encryption device. The TDM framing bits are separated from the information bits, the information bits are encrypted, and then the framing bits are reunited with the encrypted information bits.

U.S. Pat. No. 5,303,303 to White shows a network communication system for sending secure packets on an open network which links secured networks. The packets to be sent are encrypted and given new header and trailer portions before transmission on the open network.

U.S. Pat. No. 5,257,262 to Shioka et al. shows an example of digital circuit multiplication equipment.

U.S. Pat. No. 5,245,655 to Buhn et al. shows an encrypted communication system wherein data is encrypted and turned into bar codes. The bar codes are then faxed, the received bar codes read and the encrypted data decrypted.

U.S. Pat. No. 5,054,068 to Hess et al. shows an encrypting trunked communication system. It discloses the use of different coding keys for the data and control portions of an information packet.

BRIEF SUMMARY OF THE INVENTION

The present invention is a digital circuit multiplier (DCM) system which permits signals which have been encrypted at their source to obtain a multiplication gain at the DCM equipment without decrypting the signals at the DCM equipment. Detection of speech/silence is made at the encryption stage, at the source location. Distinct and separable encryptions are applied to the speech and silence portions of the signal, as well as a control signal indicating which portions of the encrypted data stream correspond to speech and silence. At the DCME transmit unit, only the control signal portion of the data stream is decrypted and the encrypted silence frames are discarded to obtain an interpolation gain. Thus, more efficient use is made of the channel capacity without the need to decrypt the speech data at the DCME.

At the DCME receive unit, the control signals are used to add encrypted silence frames back into the data stream. Once the received signals have reached a secure recipient location, the decrypter unit decrypts the speech and silence frames to present a reconstituted speech signal, complete with silence portions, to the end user.

It is an object of the present invention to provide a digital circuit multiplication (DCM) system which provides a multiplication gain for an encrypted signal which has been encrypted remotely from the digital circuit multiplication equipment (DCME).

It is also an object of the present invention to provide a digital circuit multiplication (DCM) system which provides a multiplication gain for an encrypted signal which is to be decrypted remotely from the digital circuit multiplication equipment (DCME).

It is also an object of the present invention to provide a DCM system which provides a multiplication gain for an encrypted signal, wherein the DCM system provides the multiplication gain in a secure manner.

Other objects of the present invention will become clear from the following description of the preferred embodiment of the invention.

BRIEF DESCRIPTION OF THE DRAWINGS

FIG. 7 shows an expanded block diagram of the decryption control block from FIG. 6.

FIG. 8 shows an expanded block diagram of the decrypter unit according to the present invention.

DETAILED DESCRIPTION OF THE INVENTION

Figure 1:
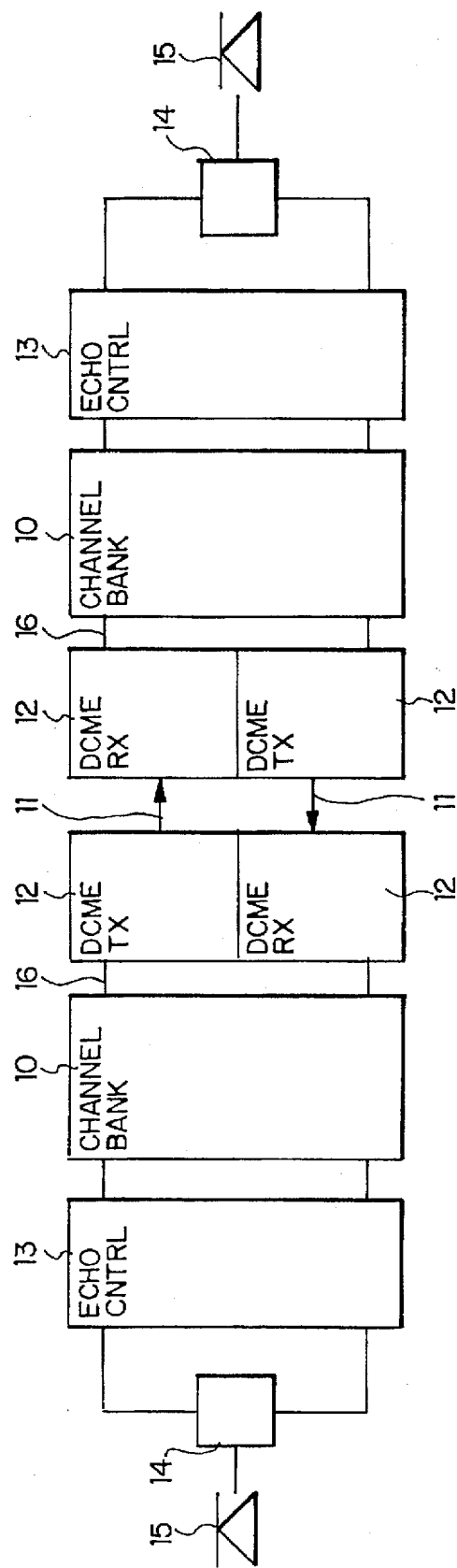
FIG. 1 shows a block diagram of a conventional implementation of a digital circuit multiplication (DCM) system implemented in a telephone connection.
Figure 2A:
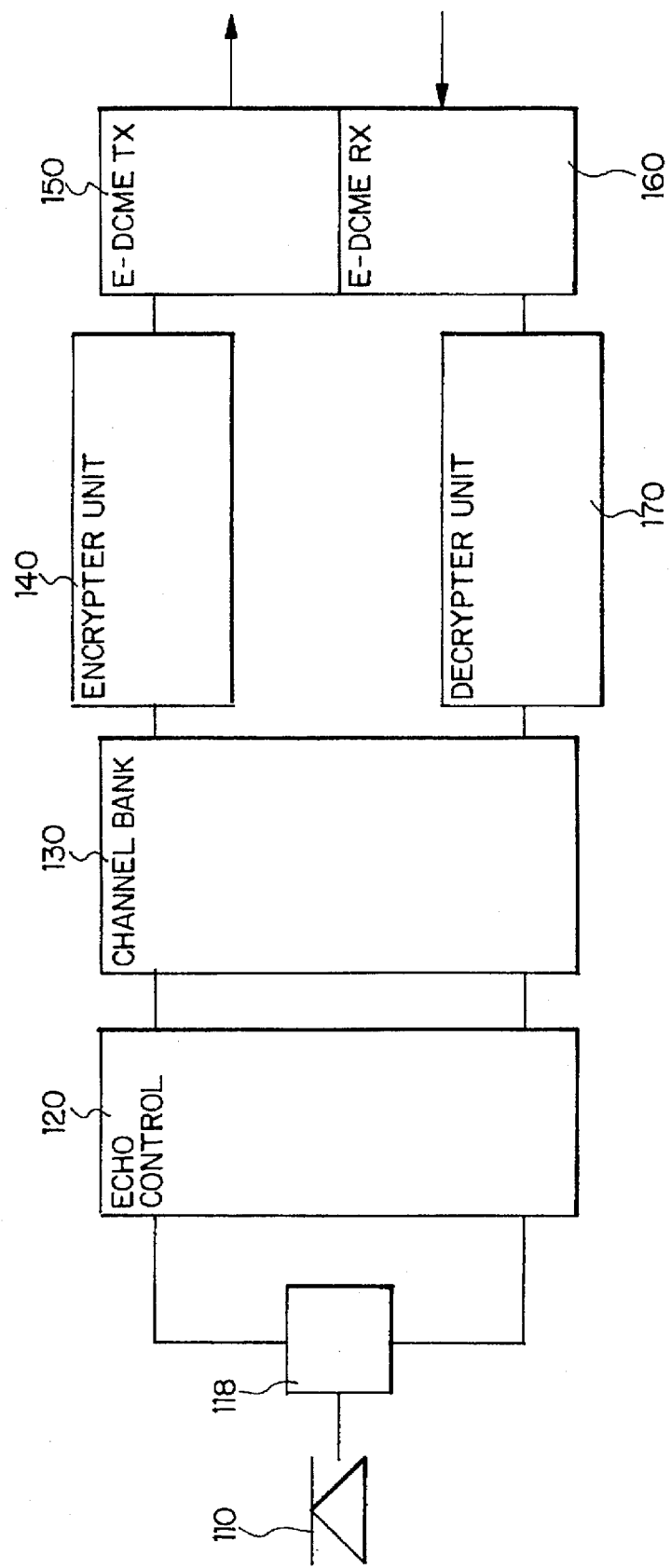
FIG. 2A shows a block diagram of one end of a communication system employing an Encryption-Digital Circuit Multiplication (E-DCM) system according to the present invention.

A general illustration of an exemplary communication system according to the present invention is shown in FIG. 2A. FIG. 2A shows a block diagram of one end of a telephone connection employing a DCM system and having encryption and decryption blocks.

Speech information which is to be kept secure flows from a telephone 110, through an echo control device 120 and a channel bank 130, to the encrypter unit 140, where the speech information is encrypted before it leaves the presumably secure local area where the telephone is located. Of course, the encrypter unit (as well as the decrypter unit) may be located between the echo control circuitry and the channel bank, or it may even be located between the echo control circuitry and a four-wire telephone.

The encrypted digital circuit multiplier equipment transmit unit 150 (E-DCME TX) is located remotely from the encrypter unit 140 and functions to obtain a multiplication gain by selectively assigning the encrypted speech information to a transmission channel. The transmission channel (which is also commonly referred to as a "bearer channel") may be via any chosen transmission medium. Examples of such convenient media are optical fiber, wire cable, radio link, and satellite link.

Incoming signals from the transmission channel are received by the encrypted digital circuit multiplier equipment receive unit 160 (E-DCME RX) to be demultiplexed and reconstituted with silence portions for the appropriate terrestrial channel. The output of the E-DCME RX is coupled via a terrestrial channel to the decrypter unit 170 which is located locally at the presumably secure site of the receiving telephone.

Figure 2B:
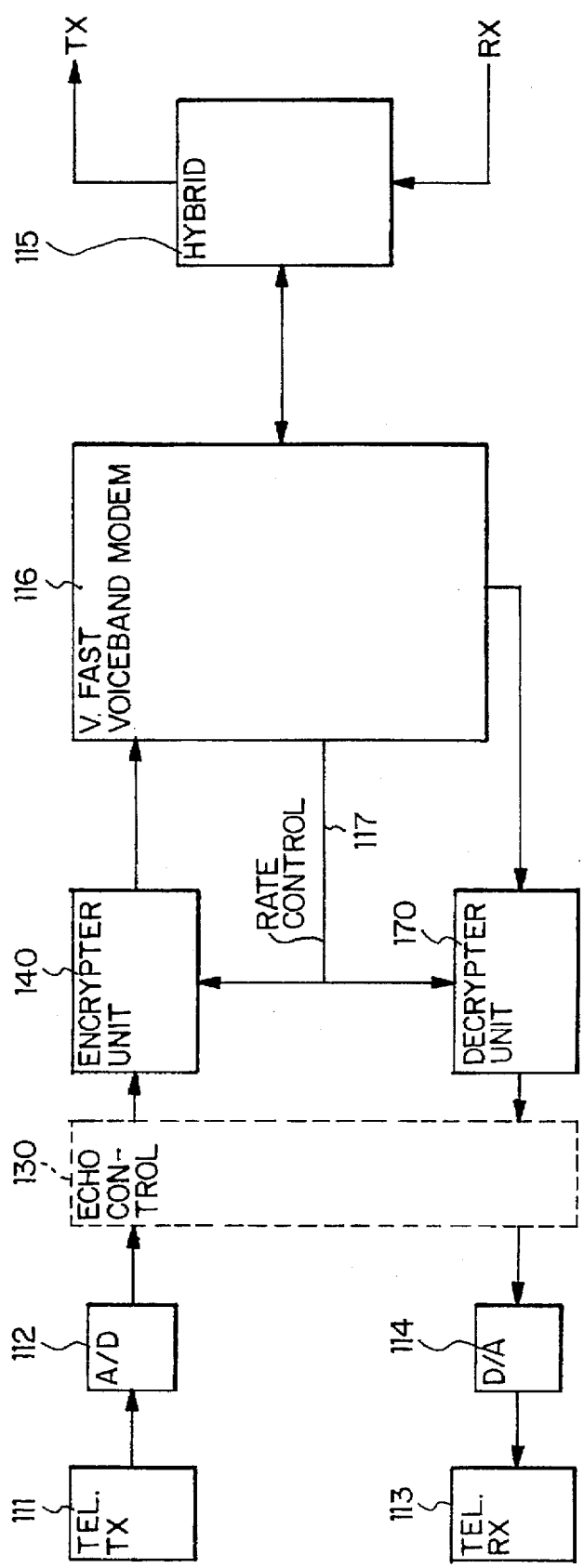
FIG. 2B shows a block diagram of an implementation of the present invention according to a preferred embodiment.

A preferred embodiment of the invention is illustrated in FIG. 2B. This is an implementation of an encrypted digital multiplication circuit system in combination with a V.fast modem. The V.fast standard is also known as the V.34 standard. The encrypter unit according to the present invention (see FIG. 4) and the decrypter unit according to the present invention (see FIG. 8) may be implemented with a V.fast modem. This would provide encrypted communications at an adaptive rate controlled by the modem.

The telephone transmit circuit 111 originates a signal which is analog-to-digital converted by A/D converter 112. The output of converter 112 is presented to the encrypter unit 140 which functions to encrypt the input digital speech in a manner which is explained in detail below. The encrypter unit 140 output is presented to the V.fast modem 116 for transmission over an outgoing terrestrial channel TX via hybrid circuit 115. The V.fast functions to control the rate 117 at which both the encrypter unit 140 and the decrypter unit 170 operate. Signals received from an incoming terrestrial channel RX are coupled through hybrid circuit 115 to the V.FAST modem 116. The modem 116 presents the received encrypted signal to the decrypter unit 170 for decryption. The decrypted output of the decrypter unit 170 is converted into an analog signal by D/A converter 114 for ultimate reception at the telephone receiver circuit 113.

Optionally, the embodiment of FIG. 2B may include an echo control 130 connected between the converter 112 and the encrypter unit 140, and between the decrypter unit 170 and the converter 114.

What follows is an exemplary embodiment of a DCM system according to the present invention. The system may be modified to encompass the transmission of encrypted signals of various bit rates. The system may also function to simultaneously handle traffic which has not been encrypted.

Figure 3:
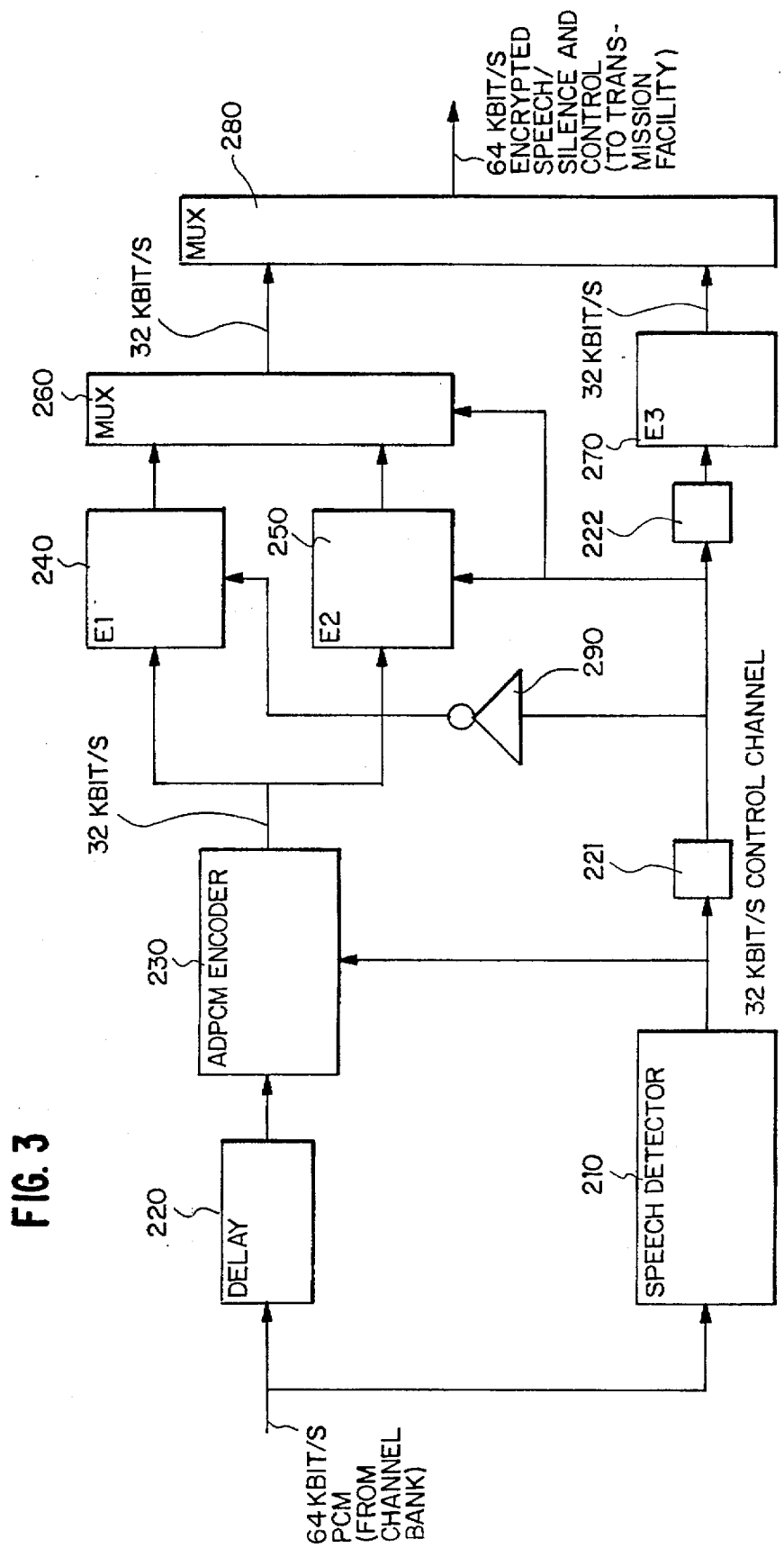
FIG. 3 shows an expanded block diagram of the encrypter unit according to the present invention.

FIG. 3 shows a block diagram of the internal structure of an encrypter unit 200 according to the present invention. To overcome the speech detection problem, the speech detector 210 is located in the encrypter unit 200 at the originating location of the signal (rather than at the site of the DCME as practiced in the conventional system) where it can receive its usual 64 kbit/s PCM A/µ law input signal. The speech is then encoded by ADPCM encoder 230 using 32 kbit/s adaptive differential pulse code modulation (ADPCM) prior to being encrypted and a control channel is created using the remaining 32 kbit/s output from speech detector 210. As an alternative, some more effecient algorith other than ADPCM may be used, such as a 16 kbit/s LD-CELP encoding scheme (ITU-T Rec. G.728).

Three distinct encryption devices are used in the encrypter unit. The speech detector 210 controls the alternative selection of the E1 silence encrypter 240 when no active signal is present or the E2 speech encrypter 250 when an active signal is detected. This alternative control is represented by the input from the control channel to each of encrypter 240 and encrypter 250, the former being via inverter 290. Further, the alternative outputs of the E1 and E2 encrypters, 240 and 250, are presented to multiplexer 260, which produces a single output signal. When either encrypter 240 or 250 is not selected, the clock of the non-selected encrypter must be stopped to maintain the bit integrity of the transmitted encrypted signal. Therefore, either block or convolution encryption devices may be used.

A third E3 encrypter 270 is used for the control signals on the 32 kbit/s channel from speech detector 210. In addition to voice/silence transition information, these signals would also include priority level, alarm information, frame information, and dynamic load control related signalling. The output of the E3 encrypter 270 and the output of the multiplexer 260 are presented to the multiplexer 280, whose output is the overall encrypted signal.

The E2 speech encrypter 250 provides the actual function of protecting the information in the signal and, thus, it employs a secure encryption algorithm E2. Many such secure algorithms are well known in the art. An example of using plural encryption algorithms via distinct encrypters in a trunked communication system is shown is U.S. Pat. No. 5,054,068 to Hess et al., which is hereby incorporated by reference.

The E3 control signal encrypter 270 may employ an encryption algorithm (perhaps the same as that of other encrypters in the system or, preferably, another), or it may simply pass the control signal without encrypting it at all. In other words, use of an encryption algorithm E3 in encrypter 270 is optional if one wishes to rely solely upon the E2 algorithm for the security of the information signal. For purposes of illustration, though, it will be assumed throughout the rest of the description that the control signal is actually encrypted by the encrypter 270.

The E1 silence encrypter 240 may employ an encryption algorithm E1 (perhaps the same as that of other encrypters in the system or, preferably, another), or it optionally may simply act as a filler signal made from a pseudo-random noise code, or it optionally may use any sort of transparent filler signals which do not disguise the nature of the signal as being a silence portion.

The processing delay for speech detection is included in delay unit 220, FIG. 3, at the source. Delay unit 220 may also include extra delay to anticipate any queuing delay which could be encountered in the transmit unit. Delay units 221 and 222 include delay for more efficient encoders such as LD-CELP and any other miscellaneous delay for proper signal alignment of the gated encryption operation. Also, delay is essential to prevent any clipping from occurring which could render the received signal indecipherable.

Figure 4:
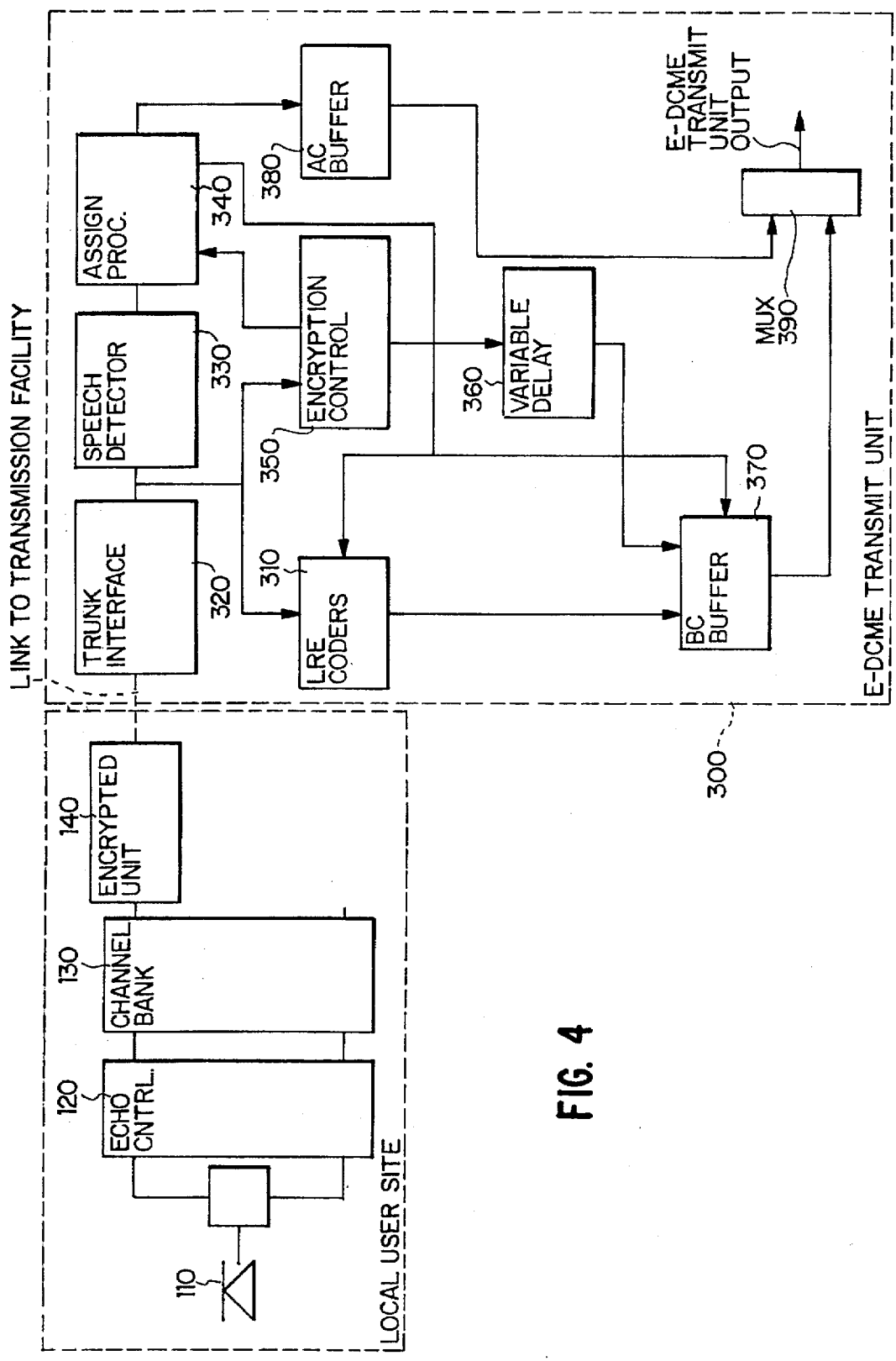
FIG. 4 shows an expanded block diagram of an E-DCME transmit unit according to the present invention, connected to the encrypter unit and other upstream components of the system.

FIG. 4 shows an expanded block diagram of a preferred E-DCME transmit unit. The trunk interface 320 receives the output from the encryption unit 140 and selects a terrestrial channel to be processed by the multiplication circuitry. The E-DCME TX dynamically determines whether the incoming signal traffic is encrypted or non-encrypted.

If the traffic is non-encrypted, the E-DCME TX functions as a conventional DCME transmit unit by sending the traffic through a LRE coder 310 so that a low-rate encoding may be performed on the signal, and by subjecting the traffic to speech detection 330 so that a channel assignment can be made or terminated, as appropriate, by the assignment processor 340.

If the traffic is encrypted, the E-DCME TX functions to route the traffic through the encryption control unit 350 and to bypass both the LRE coder 310 and the speech detector 330. The encryption control unit 350 provides an output to the assignment processor 340 to make a channel assignment if the traffic is active (that is, contains speech information). The encryption control unit 350 provides an output of encrypted information signals to the bearer channel (or transmission channel) BC buffer 370 through a variable delay 360. The output of the AC buffer 380 and the BC buffer 370 are provided to a multiplexer 390, which combines them to form an E-DCME transmit unit output.

Figure 5:
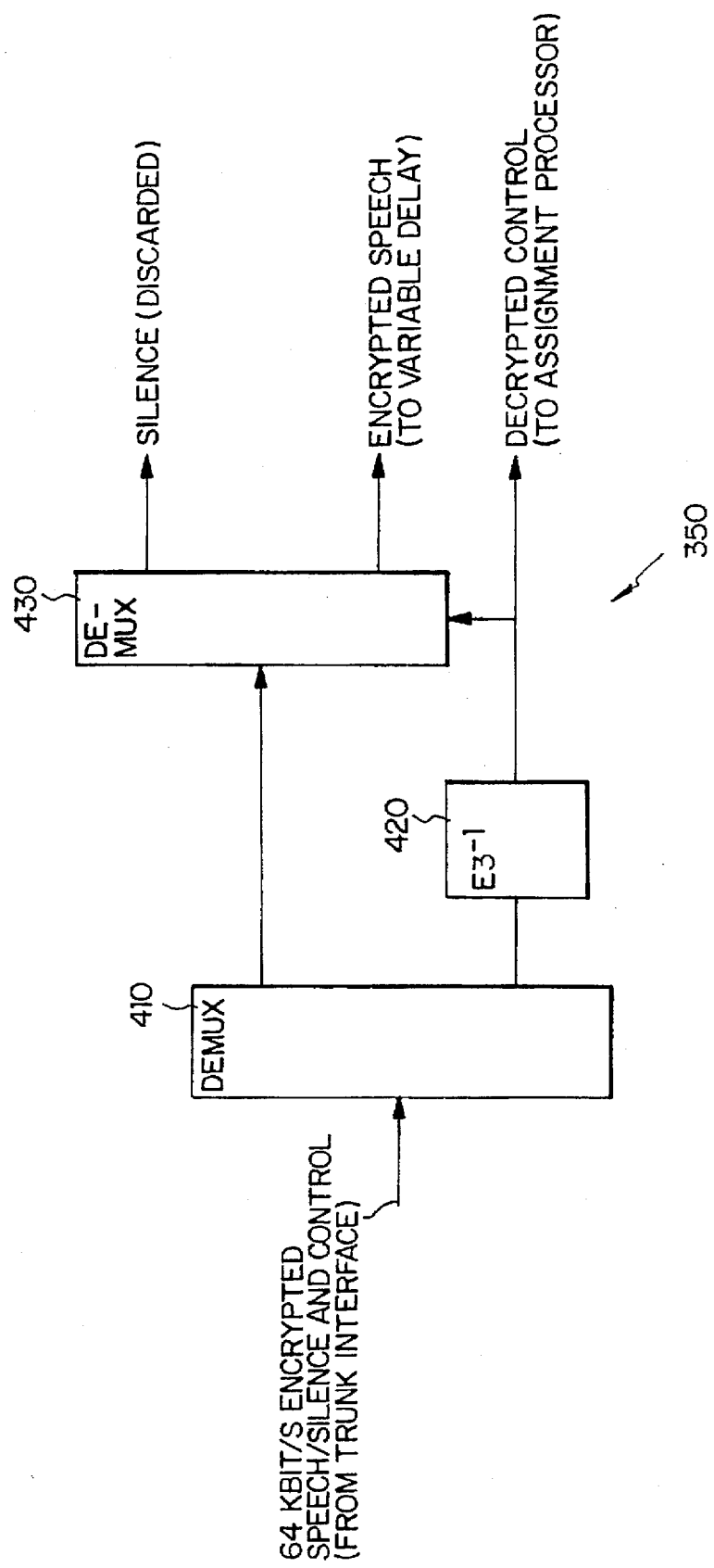
FIG. 5 shows an expanded block diagram of the encryption control block from FIG. 3.

FIG. 5 shows the internal block diagram of the encryption control section 350 of the E-DCME TX, for allowing digital speech interpolation of a digital data stream which has already been encrypted. At the E-DCME transmit unit 300, the control signal received from encrypter unit 140 via the trunk interface 320 must be decrypted by $E3^{-1}$ decrypter 420. The processing delay for this process is included in delay unit 220 at the source, as seen in FIG. 3. This delay unit 220 may also include extra delay to anticipate any queuing delay which could be encountered in the transmit unit 300. The transmitted signal must match the output of E2 encrypter 250 exactly so no clipping of any kind is permitted. Variable delay 360, in FIG. 3, may also be introduced in the transmit unit 300 to provide a short term storage until the signal can be transmitted.

It is important that the transmitted signal match the output of E2 encrypter 250 exactly due to the fact that an $E2^{-1}$ decrypter, as discussed subsequently, cannot decrypt the signal if even a small portion of it is clipped during DCME handling or transmission. This is because a loss of even a small part of the bit stream would destroy synchronization—a significant amount of the information signal would be forfeited as indecipherable while synchronization is being re-established.

The output of $E3^{-1}$ decrypter 420 is used to control a demultiplexer 430, which removes the encrypted silence bits from transmission. The encrypted speech information signal will be assigned to a 4-bit (i.e., 32 kbit/s) interpolated bearer channel which is protected against bit reduction normally used for overloaded channel creation.

This assumes that the same transmit unit is simultaneously accommodating non-encrypted traffic with the encrypted traffic. In this case, the transmit unit 300 contains all of the normal DCME functions and has, in addition, the added capability of the encrypted operation. If mixed traffic is not carried, the additional variable delay, per channel dynamic load control or reduced circuit multiplication gain will have to be used to protect against the occurrence of clipping.

Figure 6:
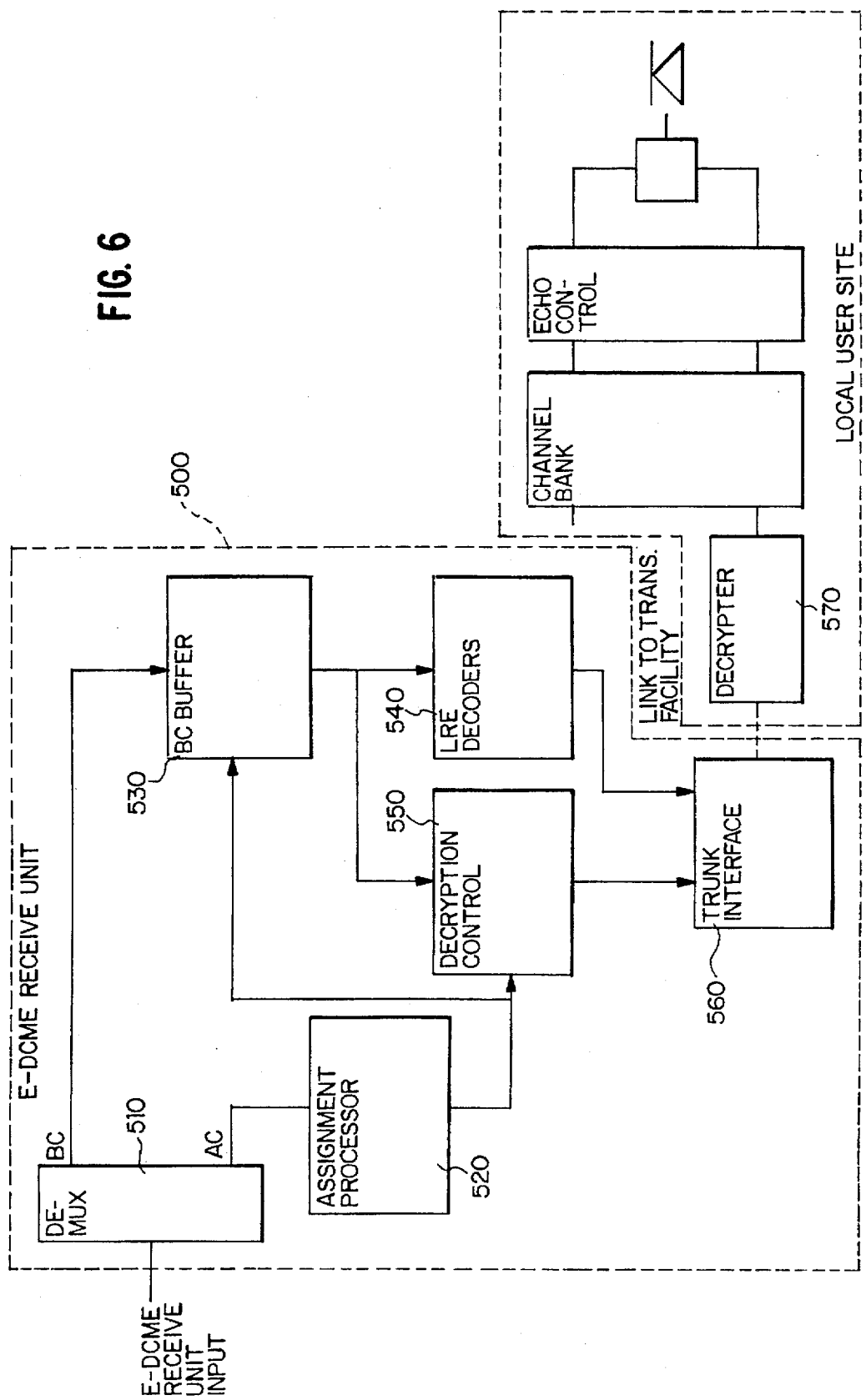
FIG. 6 shows an expanded block diagram of the E-DCME receive unit according to the present invention, connected to the decrypter unit and other downstream components of the system.

FIG. 6 shows an expanded block diagram of the E-DCME receive unit (E-DCME RX) 160 in FIG. 2A. On the receive side of the E-DCME system, in the receive unit 160, 500, the reverse operations of those performed in the transmit unit will occur. A E-DCME receive unit input is received at demultiplexer 510, which separates the assignment information AC from the multiplexed bearer channel traffic BC. The AC output of the demultiplexer 510 is provided directly to the assignment processor 520 which determines which traffic on which bearer channels is to be properly assigned to which terrestrial channel. The BC output of the demultiplexer 510 is provided to the BC buffer 530.

The channel assignment determinations output by the assignment processor 520 are provided to both the BC buffer 530 and the decryption control unit 550. If the traffic being handled is non-encrypted, the E-DCME RX functions as a conventional DCME transmit unit by sending the traffic from the BC buffer 530 to the LRE decoders 540 which re-encode the signal back to its original higher bit rate. If the traffic being handled is encrypted, the E-DCME RX functions to send the traffic from the BC buffer 530 to the decryption control unit 550. In either case (encrypted traffic or non-encrypted traffic), the signal is presented by the decryption control 550 or the LRE decoders 540, respectively, to the trunk interface 560 for coupling to an appropriate terrestrial channel.

FIG. 7 shows an expanded block diagram of the decryption control block 550, shown in FIG. 6, at the E-DCME reception end. An E5 second control encrypter 620 receives the control signals from the assignment processor 520, shown in FIG. 6, for encryption. The control channel must convey the start and stop locations of the E2 encrypted speech information signal. A new silence encryption sequence is provided by an E4 second silence encrypter 610. The multiplexer 630 functions to alternately pass through, based upon the control signals provided from the assignment processor, either the 4-bit, 32 kbit/s E2 encrypted signal from the BC buffer 530, or the E4 silence code sequence. The combined E4/E2 signal (at 32 kbit/s) is provided to multiplexer 640 to be multiplexed with the E5 encrypted control signal to form a 64 kbit/s signal for transmission to the recipient party, via the trunk interface 560. The output of multiplexer 640 is a combined signal which contains encrypted speech information, encrypted silence, and encrypted control information.

All of the encrypter units (240, 250, 270, 610, 620) as well as the decrypter units (420, 720, 750) will be DCME frame justified so that transitions occur only on DCME frame boundaries. This requires the control channel to include DCME frame clock information and suitable alignment must occur at the E-DCME receive unit. In addition, the delay 220, of FIG. 4, must permit the recognition of speech to be advanced in time to the start of the current DCME frame and the termination of the speech signal must be extended to the end of the current DCME frame where "current" means the frame in which the transition is detected. This guarantees that no encryption mistracking will occur due to asynchronous speech detection transitions.

As discussed above, regarding E1 silence encrypter 240, the E4 second silence encrypter 610 may employ an encryption algorithm (perhaps the same as that of other encrypters in the system or, preferably, another), or optionally it may simply act as a filler signal made from a pseudo-random noise code, or it may optionally use any sort of transparent filler signals which do not disguise the nature of the signal as being a silence portion.

As discussed above regarding E3 control signal encrypter 270, the E5 second control encrypter 620 may employ an encryption algorithm (perhaps the same as that of other encrypters in the system or, preferably, another), or it optionally may simply pass the control signal without encrypting it at all.

FIG. 8 shows a block diagram of the decrypter unit at the recipient end of the communications connection using E-DCME according to the present invention. At the recipient party, in the decrypter unit, the received signal from the terrestrial channel is split apart by demultiplexer 710 into the E2/E4 encrypted portion which is provided to delay 730 and to E5$^{-1}$ decrypter 720. The decrypted control signal produced by decrypter 720 is provided to demultiplexer 740 to control which portions of the E2/E4 composite encrypted signal (received from the delay 730) are to be provided to the E2$^{-1}$ decrypter 750. The E4 encrypted silence bits are discarded. The E2$^{-1}$ decrypter 750 yields the 32 kbit/s ADPCM encoded speech which is provided to the ADPCM decoder 760. During the silence interval, an idle pattern is provided to the ADPCM decoder 760. At the start of each speech spurt, the ADPCM decoder 760 unit should be reset (initialized).

The conventional digital circuit multiplication equipment (DCME) is modified to handle encrypted traffic, thereby forming encrypted-digital circuit multiplication equipment (E-DCME).

One modification is the removal of the low-rate encoder 310 (LRE) from the signal stream when encrypted traffic is received at the DCME. So as not to disturb the encrypted signal and prevent it from being decrypted, no attempt is made to re-encode the encrypted signal at a lower bit rate. Thus, no transcoding gain can be realized. All the multiplication gain in an E-DCME is provided from time interpolation gain; none is from transcoding gain.

Another modification is the addition of sub-systems to handle the modified method of digital speech interpolation. As noted above, the actual detection of speech occurs at the encrypter unit at the remote origination site. Thus, at the E-DCME the time interpolation task is a matter of decrypting the control signals which will reveal which portions of the signal stream may be disregarded as silence, and which portions are to be assigned a transmission channel for transmission onward as information. Where encryption is required on a number of channels originating from the same physical location, the 32 kbit/s control channel may be configured to accommodate more than one encrypted signal. This permits the 64 to 32 kbit/s transcoding gain to be realized on the transmission facility between the source and the remotely located DCME. The full 2:1 gain is not realized due to the overhead of the control channel.

While a preferred embodiment of the present invention has been shown and described, it will be understood by those skilled in the art that the foregoing and other changes in form and detail may be made therein without departing from the spirit and scope of the invention which is limited only by the terms of the appended claims.

What is claimed is:

1. A digital circuit multiplication (DCM) system for providing a multiplication gain for a signal which originates at an originating location, is borne across at least two terrestrial channels and a transmission channel, and which arrives at a destination location, said system comprising:

digital circuit multiplication means for interfacing the transmission channel with the terrestrial channels; and means for achieving a multiplication gain when the signal has been encrypted.

2. A DCM system according to claim 1, wherein the signal has been encrypted at the originating location which is remote from the digital circuit multiplication means.

3. A DCM system according to claim 2, wherein the encrypted signal is decrypted only upon arrival at the destination location.

4. A DCM system according to claim 2, wherein the DCM system provides the multiplication gain in a secure manner.

5. A method for providing a multiplication gain for a signal which originates at an originating location, is borne across at least two terrestrial channels and a transmission channel, and which arrives at a destination location, said method comprising the steps of:

encrypting the signal;

interfacing the transmission channel with the terrestrial channels; and providing a multiplication gain when the signal has been encrypted.

6. A method according to claim 5, wherein the step of encrypting is performed at the originating location which is remote from the location where said step of interfacing is performed.

7. A method according to claim 6, further comprising the step of:

decrypting the encrypted signal only upon arrival at the destination location.

8. A method according to claim 6, wherein the multiplication gain is provided in a secure manner.

9. A digital circuit multiplication (DCM) system comprising:

an encrypter unit having an input at which an incoming digital signal is received, and an output which is encrypted;

a digital circuit multiplication equipment transmit unit (DCME-TX) having an input and an output;

a digital circuit multiplication equipment receive unit (DCME-RX) having an input and an output;

a decrypter unit having an input and an output which is at decrypted;

wherein said output of said encrypter unit is connected to said input of said DCME-TX, and said output of said DCME-TX is connected to said input of said DCME-RX via a bearer channel, and said output of said DCME-RX is connected to said input of said decrypter unit;

whereby a multiplication gain is realized by the system to the extent that said incoming digital signal has an activity factor less than 100 percent.

10. A DCM system according to claim 9, wherein said encrypter unit comprises a speech detector having an input and an output;

wherein said input of said encrypter unit is connected to said input of said speech detector and said output of said speech detector provides a control signal which indicates when said incoming digital signal is active.

11. A DCM system according to claim 10, wherein said encrypter unit further comprises a first encrypter element having a signal input, a control input, and an output;

wherein said signal input of said first encrypter element is connected to said input of said encrypter unit, and said control input is connected to said output of said speech detector;

whereby said output of said first encrypter element is produced only when said control signal indicates said incoming digital signal is active.

12. A DCM system according to claim 11, wherein said encrypter unit further comprises a second encrypter element having an input and an output;

wherein said input of said second encrypter element is connected to said output of said speech detector;

whereby an encrypted control signal is produced at said output of said second encrypter element.

13. A DCM system according to claim 12, wherein said encrypter unit further comprises a multiplexer having plural inputs and an output;

wherein said output of said first encrypter element is coupled to one of said multiplexer's inputs and said output of said second encrypter unit is coupled to another of said multiplexer's inputs;

whereby a combined encrypted signal is produced at the output of said multiplexer comprising said encrypted control signal and the output of said first encrypter element, and said combined encrypted signal is said output of said encrypter unit.

14. A DCM system according to claim 9, wherein said DCME-TX has a decrypter element whereby control signals are decrypted.

15. A DCM system according to claim 13, wherein said DCME-TX has a decrypter element whereby only the encrypted control signal part of the combined encrypted signal is decrypted.

16. A DCM system according to claim 9, wherein information contained in said output of said encrypter unit remains secure from decryption throughout the DCM system.

* * * * *